Patented Feb. 7, 1939

2,146,007

UNITED STATES PATENT OFFICE 2,146,007

ALKYLATED RESORCINOL

Euclid W. Bousquet, Wilmington, Del., assignor to E. I. du Pont de Nemours & Company, Wilmington, Del., a corporation of Delaware No Drawing. Application July 2, 1937,
Serial No. 151,664

14 Claims. (Cl. 260—625)

This invention relates to new germicides and antiseptics and more particularly refers to certain new alkyl derivatives of resorcinol possessing excellent bactericidal properties and processes for their production.

Heretofore various derivatives of resorcinol have been known to possess bactericidal properties. Alkyl resorcinols have been produced which were of more or less value in the production of antiseptics and germicides generally. However, certain of these alkyl resorcinols possessed disadvantages in that their bactericidal properties were not sufficiently pronounced in dilute solutions and under widely varying conditions. Another disadvantage of certain of these resorcinol derivatives was that they were difficultly soluble in water or lacked satisfactory bactericidal properties when dissolved in this medium.

It is an object of this invention to produce resorcinol derivatives which possess satisfactory bactericidal properties over a wide range of conditions. A still further object is to produce resorcinol derivatives which have excellent bactericidal properties in neutral aqueous solutions. A still further object is to produce germicides and antiseptics which have high antiseptic properties in very dilute aqueous solutions. A still further object is to produce antiseptics which are sufficiently soluble in water to render the resulting solutions beneficial as germicides and antiseptics generally. Additional objects will become apparent from a consideration of the following description and claims.

These objects are attained according to the herein described invention wherein resorcinol is reacted with a mixture of higher normal primary alcohols, which predominate in n-decyl alcohol, in the presence of a dehydrating agent. In a more restricted sense this invention is concerned with the product formed by the reaction of resorcinol and a mixture of octyl, decyl and dodecyl alcohols, predominating in decyl alcohol, in the presence of zinc chloride. In its preferred embodiment this invention is directed to neutral aqueous solutions which contain a small amount of the product produced by the reaction of resorcinol and normal decyl alcohol, at elevated temperatures, in the presence of zinc chloride.

This invention may be more readily understood by a consideration of the following illustrative examples:

Example 1

158 parts by weight of n-decyl alcohol, 110 parts by weight of resorcinol, and 238 parts by weight of zinc chloride were heated by means of an oil bath in a one liter three-necked flask fitted with an agitator for 10 hours at 150–160° C. The cold reaction mixture was diluted with ether and then washed with water containing about 10% of hydrochloric acid. It was washed four times with water then dried with sodium sulfate, and distilled from a modified Claisen flask. 75 parts by weight of a yellow viscous oil was obtained which distilled at 170–210° C. at 2 mm. pressure. On redistillation, the majority of the material distilled between 173–190° C. at 2 mm. pressure which on analysis for hydroxyl number gave a value of 380 compared with the calculated hydroxyl number of 448. n-Decyl resorcinol made from capric acid melts at 73–74° C. and boils at 235–240° C. at 11 mm. pressure.

Decyl resorcinol made in the above manner is readily soluble in benzene, alcohol, and ether, partially soluble in water and shows a high antiseptic action in aqueous solutions as dilute as one part in 70,000 parts of water. It is relatively non-toxic when given in proper doses, internally and possesses valuable properties as an antiseptic and germicide, being particularly effective for the bacteria present in the oral cavity.

Example 2

158 parts by weight of a mixture of alcohols composed of 39 parts by weight of octanol-1, 82 parts by weight of decanol-1 and 37 parts by weight of dodecanol-1, 110 parts by weight of resorcinol and 238 parts by weight of zinc chloride were heated by means of an oil bath in a one liter, three-necked flask provided with an agitator for 10 hours at 150–160° C. On cooling, the reaction mixture was diluted with ether and then washed with water containing about 10% of hydrochloric acid. It was washed four times with water, dried with sodium sulfate and distilled from a modified Claisen flask. A yellow colored viscous oil was obtained which distilled at 150–200° C. at 2 mm. pressure. This product is a mixture of octyl, decyl, and dodecyl side chain resorcinols and is an active bactericide.

It is to be understood that the aforesaid examples are illustrative merely of a relatively few of the many methods of carrying out the present invention. These examples may be varied widely, both with respect to the reactants and the conditions of reaction, without departing from the scope of this invention.

For example, in place of pure normal decyl alcohol (decanol-1) there may be used a mixture of higher normal primary alcohols which predominate in decyl alcohol. This mixture may contain hexyl, octyl, decyl, dodecyl, tetradecyl, hexadecyl, octadecyl and 9, 10 octadecenyl alcohols in varying proportions provided that it predominates in decyl alcohol. Where a mixture of alcohols is employed it is in general advisable to limit the amount of alcohols containing more than 10 or less than 8 carbon atoms to less than half of the entire mixture.

For instance, the alcohols obtained by the catalytic reduction of cocoanut oil may contain approximately 8.1% octyl alcohol, approximately 6% decyl alcohol, and approximately 39% dodecyl alcohol, as well as other normal primary alcohols in varying proportions. This mixture as such would not produce the most satisfactory antiseptic for general utility so it is further distilled in order to increase the percentage of decyl alcohol to a point wherein it predominates, and wherein the alcohol which forms the second largest proportion of the mixture is either octyl or dodecyl, preferably the former. This distilled fraction would then be quite satisfactory for general use when reacted in accordance with the processes set out herein. Another source of alcohol to be used in obtaining the objects hereof is the seed fat of the California bay tree. This seed fat may be catalytically hydrogenated in such manner that the carboxyl group is reduced to produce a primary alcohol group. The resulting mixture of alcohols contains approximately 1% octyl alcohol, approximately 37% decyl alcohol, and approximately 62% dodecyl alcohol. This mixture of alcohols may be further fractionated in order to produce a distillation fraction which predominates in the decyl alcohol. In other words, the temperature of distillation is maintained sufficiently low so that the great majority of the dodecyl alcohol is not carried over into the distillate.

As in the case of the alcohols, the dehydrating agent may also be varied. Examples of dehydrating agents contemplated are zinc chloride, calcium chloride, magnesium chloride, sodium sulfate, and the like. For optimum results it is in general advisable to use zinc chloride, and this is to be understood as the preferred dehydrating agent for use herein.

The temperature of the reaction may be varied considerably, temperatures from about 125–225° C. being contemplated. The preferred temperature range for general use is to be understood as 150–160° C. although higher and lower temperatures than the aforesaid may be used, as previously stated. It has been found that at temperatures as low as 125° C. there is apt to be an appreciable quantity of ether formed, while at temperatures of 225° C. and above tar formation is likely to become pronounced. Although neither the formation of ethers nor tars will prevent the desirable objectives of this invention from being attained, it is in general desirable to avoid them as much as possible.

The amount of dehydrating agent may be varied considerably. Naturally, the amount which is used will depend upon the particular dehydrating agent contemplated. In the case of the preferred dehydrating agent, zinc chloride, an amount which varies from 0.1 mol to 5.0 mols per mol of alcohol is ordinarily adequate. More satisfactory results are usually obtained by using an amount of zinc chloride within the range of 0.5 mol to 2.0 mols per mol of alcohol. In this connection it may be mentioned that at high temperatures the amount of dehydrating agent required may be somewhat reduced over that required at lower temperatures.

The methods of separating the resulting product in pure form may be varied widely from that illustrated in the aforesaid examples. Since ordinary chemical technique is sufficient for this purpose, in view of the instructions of the present application, no further description thereof is deemed necessary.

Resorcinol derivatives produced in accordance with the preceding instructions are of particular value in the preparation of germicides and antiseptics generally. They are of special value in the preparation of antiseptics for use as mouth washes since the types of bacteria most frequently found in the oral cavity have been found to be particularly susceptible to attack by these compounds. In preparing these bactericidal compositions the usual constituents may be added to the products heretofore described. For instance, ingredients such as water, ethyl alcohol, alcohol-water mixtures, vegetable oils generally, mineral oils, glycerin, glycol, etc. may be added to produce these bactericidal solutions and emulsions.

When these resorcinal derivatives are dissolved in an oil such as olive oil they may be readily administered with a minimum of irritation to the stomach and with excellent absorption by the body. These compounds need not be isolated in the highest state of purity, since small amounts of resorcinol ethers, such as monodecyl resorcinol ether and didecyl resorcinol ether do not appreciably detract from their advantageous results.

Where the bactericidal composition is to be used internally it is advisable to select as a carrier an edible oil which does not interfere with the metabolism. Edible or bland oils such as animal or vegetable oils, and in particular olive oil, are of pronounced value in this connection.

The amount of resorcinol derivative or derivatives which are combined with the oil may be varied considerably. A dilute solution containing, for example, 3% decyl resorcinol in olive oil is quite satisfactory. On the other hand, a much higher content of decyl resorcinol may be used, for instance, a concentration which varies from 5–25% or more. Where a high concentration is used the product is particularly adapted to use in capsule form. The coating of the capsule may be of enteric character, thereby retarding absorption of the resorcinol derivative in the stomach and permitting it to pass through to the intestines practically unchanged.

As an example of the bactericidal value of the present decyl resorcinol, as compared with other resorcinol derivatives the following tabulation is given:

Bactericidal tests on various alkyl resorcinols

|  | Staphylococcus aureus | Staphylococcus blood serum 10% | Streptococcus hemolyticus | Monilia albicans |
|---|---|---|---|---|
| Phenol: |  |  |  |  |
| 5 min | 70 | 60 | 80 | 140 |
| 10 min | 80 | 70 | 90 |  |
| 15 min | 90 | 80 | 90 |  |
| Hexyl resorcinol (from caproic acid): |  |  |  |  |
| 5 min | 5000 |  |  | 4000 plus |
| 10 min | 5000 |  |  | 4000 plus |
| 15 min | 5000 |  |  | 4000 plus |
| Hexyl resorcinol (from n-hexyl alcohol): |  |  |  |  |
| 5 min | 5000 | 2000 plus | 10000 | 10000 |
| 10 min | 7000 | 2000 plus | 10000 | 10000 |
| 15 min | 7000 | 2000 plus | 10000 | 10000 |
| Octyl resorcinol (from n-octyl alcohol): |  |  |  |  |
| 5 min | 10000 | 1000 | 40000 | 20000 plus |
| 10 min | 25000 | 2000 | 40000 | 20000 plus |
| 15 min | 25000 | 2000 | 40000 | 20000 plus |
| Octyl resorcinol (from octanol-2): |  |  |  |  |
| 5 min | 10000 | 2000 | 20000 | 20000 |
| 10 min | 20000 | 2000 | 20000 | 20000 |
| 15 min | 20000 | 3000 plus | 20000 | 20000 |
| Decyl resorcinol (from n-decyl alcohol): |  |  |  |  |
| 5 min | 50000 | 1000 | 50000 | 50000 |
| 10 min | 70000 | 1000 | 70000 | 50000 |
| 15 min | 70000 | 2000 | 70000 | 50000 |
| Decyl resorcinol (from capric acid) | N1000 |  |  |  |
| Dodecyl resorcinol (from n-dodecyl alhol): |  |  |  |  |
| 5 min | N1000 |  |  |  |
| 10 min | N1000 |  |  |  |
| 15 min | N1000 |  |  |  |

5000 indicates kill at a dilution of 1 part in 5000 parts of water. 4000 plus indicates 4000, weakest solution tested, produced kill. N1000 indicates 1000, strongest solution tested did not kill.

The decyl resorcinol produced herein is not to be confused with decyl resorcinol which may be produced by the reaction of resorcinol and capric acid in the presence of zinc chloride, followed by selective reduction of the ketone group. This latter compound has entirely different physical, chemical and therapeutic values from the decyl resorcinol which forms the subject matter of this invention. The decyl resorcinol produced in accordance with this invention shows a high bactericidal efficiency in neutral aqueous solutions. It is particularly effective on staphylococcus and streptococcus organisms. On the other hand, the decyl resorcinol which is produced by the reaction of capric acid and resorcinol as aforesaid is of little or no value in dilute aqueous solution and only shows an appreciable bactericidal efficiency when used in alkaline solutions.

Although the exact composition of the decyl resorcinol forming the subject matter of this invention is not definitely known it is believed to consist substantially of 1-3-dihydroxy-4-secondary-decyl-benzene. This composition is not definitely known and therefore it is to be understood that the present invention is not to be construed as dependent thereon. However, it is certain that this product is entirely dissimilar to the product produced by the treatment of resorcinol with capric acid and reduction of the resulting compound whereby n-decyl resorcinol is produced. Products produced by this capric acid method melt at 73–74° C. and are poorly suited for making emulsions. In contrast therewith the decyl resorcinol produced by means of this invention shows no tendency to solidify even at 0° C. Likewise, n-decyl resorcinol is made by a two step process wherein capric acid is condensed with resorcinol and the resulting ketone hydrogenated. In contrast therewith, the present process yields in one step the much more satisfactory bactericidal product which is described and claimed herein.

By means of the present invention a new compound which is particularly adapted for the manufacture of bactericidal agents is produced. This compound is entirely dissimilar in its physical and chemical structure to alkyl resorcinols heretofore known. Likewise, it possesses a much more satisfactory germicidal property than in the case of the majority of alkyl resorcinols. It may be used in dilute aqueous solutions with excellent results. Furthermore, it is compatible with a wide variety of carriers and therapeutic agents so that it is readily adapted to form a bactericidal ingredient in numerous compositions.

As many apparently widely different embodiments of this invention may be made without departing from the spirit and scope thereof, it is to be understood that the invention is not limited to the specific embodiments thereof except as defined in the appended claims.

I claim:

1. A process for producing a compound possessing antiseptic and germicidal properties which comprises reacting resorcinol with n-decyl alcohol in the presence of a dehydrating agent.

2. A process for producing a compound possessing antiseptic and germicidal properties which comprises reacting resorcinol with a mixture of higher normal primary alcohols predominating in n-decyl alcohol in the presence of a dehydrating agent.

3. A process for producing a compound possessing antiseptic and germicidal properties which comprises reacting resorcinol with n-decyl alcohol in the presence of zinc chloride.

4. A process for producing a compound possessing antiseptic and germicidal properties which comprises reacting resorcinol with a mixture of higher normal primary alcohols predominating in n-decyl alcohol in the presence of zinc chloride.

5. A process for producing a compound possessing antiseptic and germicidal properties which comprises heating to a temperature of about 150° C. to about 160° C. resorcinol and a mixture of higher normal primary alcohols predominating in n-decyl alcohol in the presence of about 0.5 to about 2.0 mols of zinc chloride per mol of the alcohol mixture, for a sufficient period of time to complete the reaction, then cooling the reaction mixture, diluting it with ethyl ether, washing it with a dilute aqueous solution of hydrochloric acid, and finally washing the resulting product with water, drying and distilling off the desired resorcinol derivative.

6. A product possessing antiseptic and germicidal properties produced in accordance with the process defined in claim 1.

7. A product possessing antiseptic and germicidal properties produced in accordance with the process defined in claim 2.

8. A product possessing antiseptic and germicidal properties produced in accordance with the process defined in claim 3.

9. Antiseptic and germicidal compositions containing a product produced in accordance with the process defined in claim 4.

10. Antiseptic and germicidal compositions containing a product produced in accordance with the process defined in claim 5.

11. A process for producing a compound possessing antiseptic and germicidal properties which comprises reacting resorcinol with n-decyl alcohol in the presence of a dehydrating agent selected from the class consisting of zinc chloride, calcium chloride, magnesium chloride, and sodium sulfate.

12. A process for producing a compound possessing antiseptic and germicidal properties which comprises reacting resorcinol with a mixture of higher normal primary alcohols predominating in n-decyl alcohol in the presence of a dehydrating agent selected from the class consisting of zinc chloride, calcium chloride, magnesium chloride, and sodium sulfate.

13. A product possessing antiseptic and germicidal properties produced in accordance with the process defined in claim 11.

14. A product possessing antiseptic and germicidal properties produced in accordance with the process defined in claim 12.

EUCLID W. BOUSQUET.